UNITED STATES PATENT OFFICE.

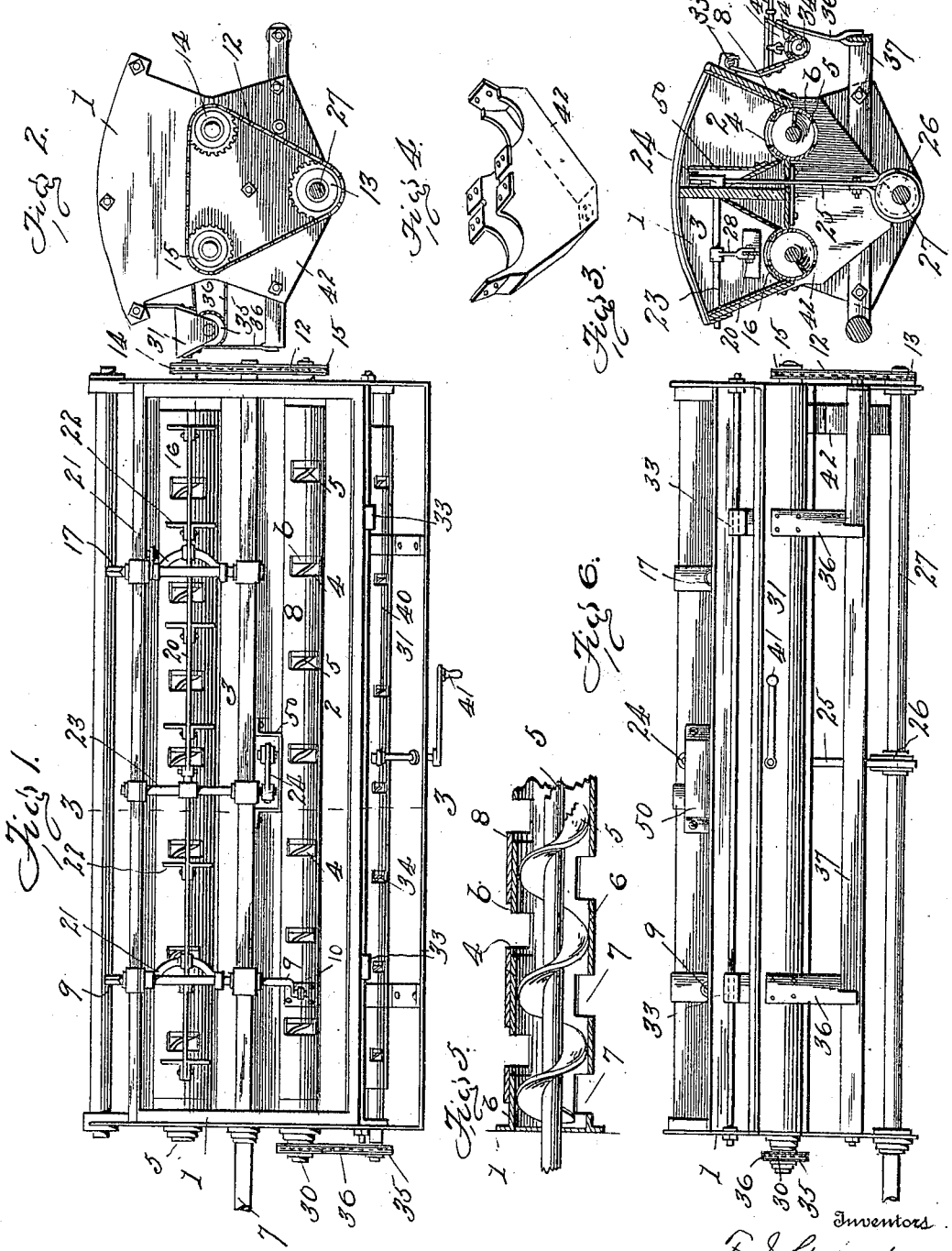

FRANK J. GENET AND WILLIAM F. GENET, OF LEOPOLD, INDIANA.

HOPPER FOR GRAIN-DRILLS.

No. 838,533.     Specification of Letters Patent.     Patented Dec. 18, 1906.

Application filed November 22, 1905. Serial No. 288,589.

*To all whom it may concern:*

Be it known that we, FRANK J. GENET and WILLIAM F. GENET, citizens of the United States, residing at Leopold, in the county of Perry and State of Indiana, have invented certain new and useful Improvements in Hoppers for Grain-Drills, of which the following is a specification.

This invention relates to seed and fertilizer distributers for drills and planters.

The object of the invention is to produce an improved compound distributing-hopper for seed-drills which shall be capable of distributing a variety of seeds to the drills or teeth of any usual form of seed-drill and shall also distribute fertilizer, and with such character of force-feed as the matter to be distributed needs.

Figure 1 is a top plan of the compound hopper. Fig. 2 is an end view of the same, showing drive-chain and gears. Fig. 3 is a cross-section about on line 3 3, Fig. 1. Fig. 4 is a perspective view of a combination nozzle or discharge-chute which may be applied at each drill-aperture. Fig. 5 is a broken longitudinal section through one of the seed-conveyers and feed-valves. Fig. 6 is a side elevation of the hopper from the front.

The hopper device is intended for attachment to the frame or body of any one of a considerable number of drills, and as the feed from the hoppers is operated from the drill in usual manner it is considered unnecessary to illustrate any particular grain-drill.

The main hopper 1 is made with two compartments or troughs 2 and 3. The compartment 2 is preferably toward the front of the machine and is a trough with inclined sides and openings 4 in the bottom. The bottom $b$ is arched. Below said bottom of the hopper there is a spiral conveyer 5, supported in suitable bearings, and this conveyer is incased with a cylindrical casing $6_n$, which is provided with openings 7, corresponding in number but not in position to openings 4 in the hopper-bottom and corresponding also with the drill tubes or teeth. The openings 7 are not directly under openings 4, but are so arranged that material which falls through openings 4 must be passed along by conveyer 5 before it can fall from opening 7, said openings being out of register.

The hopper-bottom has a valve-plate 8 with holes corresponding in number and size with the holes in the hopper-bottom. This valve-plate can be moved lengthwise of the hopper by means of its connection with a crank 10 on rock-shaft 9. The rock-shaft extends across the top of the hopper 3 and can be turned by a tool, so as to slide the cover 8, and thus open or close holes 4 more or less. The conveyer 5 is rotated by means of a sprocket-chain 12, extending from a driving sprocket-wheel 13 round similar sprocket-wheels 14 and 15 on the shafts of the screw conveyers under both the seed and fertilizer hoppers.

The fertilizer-hopper 3 is substantially like the seed-hopper 2, as has been described, having a similar bottom, slide-valve, and worm conveyer, or force-feed. The slide-valve or cover 16 is operated from a rock-shaft 17 to close the openings in the bottom more or less, as has been described of the bottom of the seed-hopper.

In addition to the worm conveyer, constituting a force-feed, the fertilizer-hopper has a reciprocating mixer-bar 20, which is hung on swinging brackets 21, pendent from the shafts 9 and 17. The mixer-bar has paddles 22 extending at each side of the bar.

A rock-shaft 23, extending across hopper 3, is moved by a crank 24, which crank is connected by pitman 25 to eccentric 26 on the driving-shaft 27. Pitman 25 extends through a well or pocket 50. Driving-shaft 27 is rotated by any suitable connection from the wheels of the drill and bears the sprocket-wheel 13.

An arm 28 rigid with rock-shaft 23 connects said shaft to the mixer-bar 20. Thus when shaft 27 rotates the mixer-bar is reciprocated longitudinally as the rock-shaft 23 swings. This reciprocation of the mixer-bar causes the fertilizer in hopper 3 to be stirred and broken up, so that it readily passes to the worm or screw conveyer under the hopper-bottom.

The shaft of worm 5 is extended beyond the end of the hopper and bears a sprocket-wheel 30. A small seed-hopper 31 in front of hopper 2 is suspended from the main hopper by hooks 33 and has a worm-wheel conveyer 34 under its bottom. The conveyer 34 has a sprocket-wheel 35 at its outer end, and a sprocket-chain 36 drives conveyer 34 from the sprocket-wheel 30. Except as to size the small seed-hopper 31 is substantially like hopper 2, but is removable from the main hopper, being supported on the main hopper by hooks 33 and braces 36, which braces rest on the frame-bar 37. The valve 40 is movable by handle 41.

From the foregoing it should be understood that the hopper is attachable to a seeding-machine of almost any variety and can be used to sow grain and fertilizer, or grass-seed with a grain and fertilizer, as may be desirable.

A chute 42 is shown in Figs. 2 and 3. This chute is one of a series which may be attached to the bottom of hoppers 2 and 3 to guide the contents of both hoppers to a single point of delivery. In many instances it is not considered desirable to guide the fertilizer to the drill-teeth, the distribution being practically broadcasting. In other instances it is preferred to guide the seeds and fertilizer to the drill-teeth. In the latter case the chutes 42 are attached to the bottom of the hoppers and serve as funnels to guide the grain and fertilizer to a single point of delivery.

It will be readily understood that the compound hopper and distributer described can be applied to many different kinds of seeding, as it is capable of distributing one, two, or three different materials. By changing the size of sprocket-wheels the speed of the conveyers can be increased or diminished.

What we claim is—

1. A compound seed-hopper and fertilizer-distributer having a seed-trough and a fertilizer-trough each having openings in its bottom, rotary conveyers under each trough, and removable nozzles or discharge-chutes by which the discharge from the openings in both troughs may be conveyed to one outlet, or otherwise, as set forth.

2. In a seeding-machine, a hopper having inclined sides and a longitudinally-movable arched bottom having a series of holes therein, a cylindrical casing in proximity to said arched bottom and having a corresponding number of holes in its upper face, and holes in its lower face out of register with said upper holes, a rotary conveyer in said casing, and means for moving the arched bottom of the hopper, all combined.

In testimony whereof we affix our signatures in presence of two witnesses.

FRANK J. GENET.
WILLIAM F. GENET.

Witnesses:
EDWIN J. PETER,
ALFRED E. PETER.